United States Patent
Nagano

(10) Patent No.: US 8,090,186 B2
(45) Date of Patent: Jan. 3, 2012

(54) PATTERN INSPECTION APPARATUS, PATTERN INSPECTION METHOD, AND MANUFACTURING METHOD OF SEMICONDUCTOR DEVICE

(75) Inventor: Osamu Nagano, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 421 days.

(21) Appl. No.: 12/406,869

(22) Filed: Mar. 18, 2009

(65) Prior Publication Data

US 2009/0252402 A1 Oct. 8, 2009

(30) Foreign Application Priority Data

Apr. 4, 2008 (JP) ................................. 2008-098320

(51) Int. Cl.
*G06K 9/00* (2006.01)
(52) U.S. Cl. ......... 382/141; 382/149; 382/190; 382/209
(58) Field of Classification Search .................. 382/141, 382/149, 190, 209, 218; 356/237.1–237.5; 348/92, 86, 125
See application file for complete search history.

(56) References Cited

U.S. PATENT DOCUMENTS

| | | | | |
|---|---|---|---|---|
| 5,694,495 A * | 12/1997 | Hara et al. | ..................... | 382/324 |
| 6,928,375 B2 * | 8/2005 | Ono et al. | ....................... | 702/81 |
| 7,408,643 B2 * | 8/2008 | Kimba et al. | ................. | 356/401 |
| 2003/0066035 A1 * | 4/2003 | Nagamura | ........................ | 716/1 |
| 2003/0126566 A1 * | 7/2003 | Saito | ................................ | 716/4 |
| 2006/0245636 A1 | 11/2006 | Kitamura et al. | | |
| 2008/0058977 A1 * | 3/2008 | Honda | .......................... | 700/110 |
| 2009/0041334 A1 * | 2/2009 | Nagano | ........................ | 382/149 |

FOREIGN PATENT DOCUMENTS

| | | | |
|---|---|---|---|
| JP | 63-138921 | | 6/1988 |
| JP | 404370947 A | * | 12/1992 |
| JP | 2005-277395 | | 10/2005 |
| JP | 2006-215528 | | 8/2006 |

\* cited by examiner

*Primary Examiner* — Hoa Pham
(74) *Attorney, Agent, or Firm* — Finnegan, Henderson, Farabow, Garrett & Dunner, L.L.P.

(57) ABSTRACT

A pattern inspection method includes: acquiring an image of a pattern; performing matching of CAD data for the pattern and the image; extracting coordinates of a plurality of points on a line segment constituting a polygon figure in the CAD data, to be defined as a first coordinate group; specifying coordinates of edge points in the image corresponding to the plurality of points to be defined as a second coordinate group; calculating differences between the coordinates corresponding to each other from the first and second coordinate group, and calculating statistics each representing a degree of deviation in the matching based on the differences; correct the polygon figure when it is determined that a correction is required as a result of judgment based on the statistics; and inspecting the pattern by comparing the corrected polygon figure with the image.

20 Claims, 10 Drawing Sheets

PATTERN INSPECTION APPARATUS, PATTERN INSPECTION METHOD, AND MANUFACTURING METHOD OF SEMICONDUCTOR DEVICE

CROSS REFERENCE TO RELATED APPLICATION

This application claims benefit of priority under 35USC §119 to Japanese patent application No. 2008-098320, filed on Apr. 4, 2008, the contents of which are incorporated by reference herein.

BACKGROUND OF THE INVENTION

1. Field of the Invention

The present invention relates to a pattern inspection apparatus, a pattern inspection method, and a manufacturing method of a semiconductor device.

2. Related Background Art

In recent years, die-to-database inspection is used as an inspection method for a circuit pattern of a semiconductor. This is a method of comparing CAD data with an SEM (Scanning Electron Microscope) image of a circuit pattern obtained by scanning a wafer with an electron beam to detect a secondary electron by use of a scanning electron microscope, thereby inspecting a circuit pattern shape or a deviation amount from the CAD data.

However, since the inspection using an electron beam requires a long time, an increase in speed is strongly demanded. Factors of the long inspection time include a time required to perform electron beam scanning and acquire an SEM image and a moving time of a stage. To reduce such times, there is adopted a method of collectively acquiring SEM images in a wide field by expanding a scan area of an electron beam to reduce the number of times of moving the stage or a method of increasing an electron beam scan speed to rapidly acquire each SEM image.

However, when the scan area is expanded, an optical distortion as Seidel's five aberrations is increased in proportion to the third power of a size of the scan area, and an image nonlinearly largely distortions at an end portion of the scan area.

Further, a deflector requires a large power (a voltage in an electrostatic deflector or a current in a magnetic field deflector) to deflect a beam in proportion to expansion of the scan area. Furthermore, when a scan speed is increased, a burden imposed on an electrical circuit used in a deflection system is largely increased, and a distortion of an electric signal waveform that is input to the deflector to defect a beam is increased, whereby an SEM image from the scan area is locally nonlinearly distorted.

When an SEM image including such a nonlinear distortion is compared with CAD data for inspection, a deviation amount from the CAD data is increased in a region where the distortion occurs, and a pseudo defect with which a normal position is determined as a defect is disadvantageously generated.

To solve the problem, a method of performing scanning to that such a distortion is cancelled out is proposed (e.g., Japanese patent laid open (kokai) No. 2005-277395). This is a method of electrically correcting a shape of a scan area by adjusting an electrical signal (a voltage in an electrostatic deflector or a current in a magnetic field deflector) inputted to a deflector because a nonlinear image distortion cannot be corrected by affine transformation or a function.

However, the method disclosed in Japanese patent laid open (kokai) No. 2005-277395 has a problem that unstableness of an electrical circuit occurs and a distortion cannot be sufficiently corrected due to an increase in burden on the electrical circuit caused by expansion of a scan area and an increase in scan speed explained above.

On the other hand, there is proposed a method in which CAD data are divided, the CAD data are corrected with respect to each divided region by using a measurement result of a pattern position obtained by a highly accurate coordinate measuring instrument, the respective corrected regions are combined to create inspection data, and the created inspection data are compared with a pattern (e.g., Japanese patent laid open (kokai) No. 2006-215528, especially FIG. 9).

However, according to the method disclosed in Japanese patent laid open (kokai) No. 2006-215528, although displacement of a formed pattern can be corrected, a distortion of an image cannot be corrected since there is no means to detect a distortion of an SEM image. Moreover, according to the method disclosed in Japanese patent laid open (kokai) No. 2006-215528, since CAD data are divided and each divided CAD data is corrected, continuity of the divided CAD data at a boundary portion must be maintained. Therefore, there is a problem that a nonlinear distortion that locally occurred cannot be corrected.

Besides, there is also proposed a method of correcting deformation of a pattern image by using positional data obtained from a reference mark formed outside an inspection pattern on a wafer (e.g., Japanese patent laid open (kokai) No. 63 (1988)-138921). According to this method, since the reference mark must be necessarily provided on the wafer, and many reference marks are required to improve a correction accuracy as shown in FIG. 16 in Japanese patent laid open (kokai) No. 63 (1988)-138921. In addition, in this method, data of a design pattern are converted into dots to correct deformation of an image. However, this method has little practicability at the present day because a design data size of a VLSI is explosively increased in recent years, a huge amount of processing time is thereby required for conversion into dots, and an unrealistic time and a throughput of a computer are required when a wide inspection area is a target.

SUMMARY OF THE INVENTION

According to a first aspect of the present invention, there is provided a pattern inspection apparatus comprising:

an imaging unit which scans a substrate having a pattern formed thereon with a charged particle beam and detects charged particles generated from the substrate to acquire an image of the pattern;

a matching unit which performs matching of CAD data for the pattern and the image;

an arithmetic unit which extracts coordinates of a plurality of points on a line segment which is drawn by use of the CAD data and constitutes an arbitrary polygon figure, defines the extracted coordinates as a first coordinate group, specifies coordinates of edge points in the image that corresponds to the plurality of points, defines the specified coordinates as a second coordinate group, calculates differences between the coordinates corresponding to each other from the first and second coordinate group, and calculates statistics each representing a degree of deviation in the matching based on the differences;

a judgment unit which judges whether correction processing is required based on the statistics;

a correction unit which performs the correction processing with respect to the polygon figure when the judgment unit determines that the correction processing is required; and an inspection unit which inspects the pattern by comparing the corrected polygon figure with the image.

According to a second aspect of the present invention, there is provided a pattern inspection method comprising:

scanning a substrate having a pattern formed thereon with a charged particle beam and detecting charged particles generated from the substrate to acquire an image of the pattern;

performing matching of CAD data for the pattern and the image;

extracting coordinates of a plurality of points on a line segment which is drawn by use of the CAD data and constitutes an arbitrary polygon figure, and defining the extracted coordinates as a first coordinate group;

specifying coordinates of edge points in the image that corresponds to the plurality of points, and defining the specified coordinates as a second coordinate group;

calculating differences between the coordinates corresponding to each other from the first and second coordinate group, and calculating statistics each representing a degree of deviation in the matching based on the differences;

judging whether correction processing is required based on the statistics;

performing the correction processing with respect to the polygon figure when it is determined that the correction processing is required; and inspecting the pattern by comparing the corrected polygon figure with the image.

According to a third aspect of the present invention, there is provided a manufacturing method of a semiconductor device comprising:

executing a manufacturing process of a semiconductor device with respect to a substrate when requested specifications are satisfied as a result of inspecting a pattern formed on the substrate based on a pattern inspection method, the pattern inspection method including:

scanning a substrate having a pattern formed thereon with a charged particle beam and detecting charged particles generated from the substrate to acquire an image of the pattern;

performing matching of CAD data for the pattern and the image;

extracting coordinates of a plurality of points on a line segment which is drawn by use of the CAD data and constitutes an arbitrary polygon figure, and defining the extracted coordinates as a first coordinate group;

specifying coordinates of edge points in the image that corresponds to the plurality of points, and defining the specified coordinates as a second coordinate group;

calculating differences between the coordinates corresponding to each other from the first and second coordinate group, and calculating statistics each representing a degree of deviation in the matching based on the differences;

judging whether correction processing is required based on the statistics;

performing the correction processing with respect to the polygon figure when the judgment unit determines that the correction processing is required; and inspecting the pattern by comparing the corrected polygon figure with the image.

DETAILED DESCRIPTION OF THE INVENTION

Figure 1:
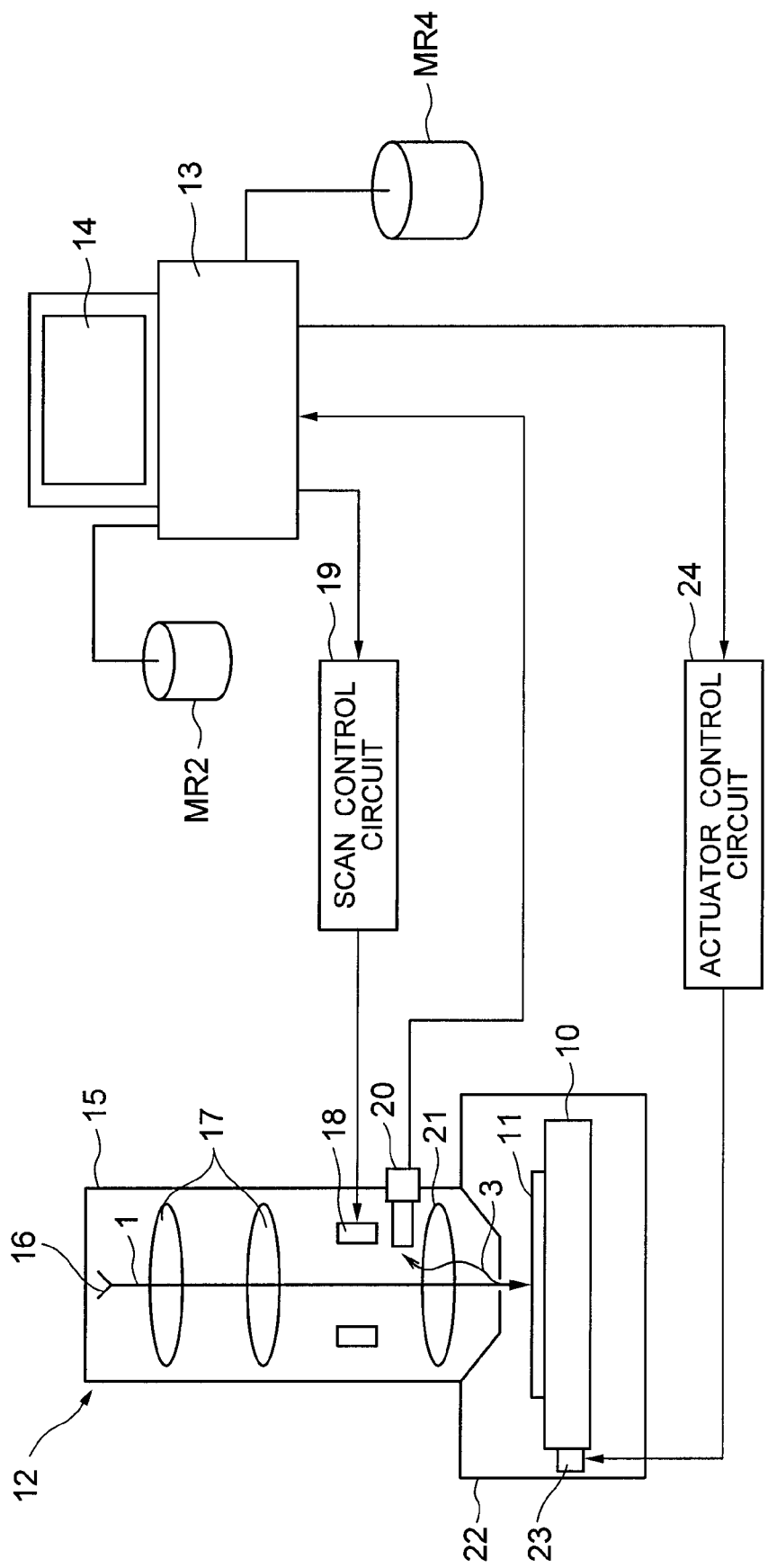
FIG. 1 is a block diagram showing an outline structure of an embodiment of a pattern inspection apparatus according to the present invention.

An embodiment of the present invention will be explained below taking die-to-database inspection as an example. It is to be noted that like reference numerals denote like parts in the drawings, and a tautological explanation will be appropriately omitted.

(1) Pattern Inspection Apparatus

FIG. 1 is a block diagram showing an outline structure of an embodiment of a pattern inspection apparatus according to the present invention. The pattern inspection apparatus depicted in FIG. 1 includes a scanning electron microscope 12, a computer 13, a scan control circuit 19, an actuator control circuit 24, a monitor 14, and memories MR2 and MR4.

The scanning electron microscope 12 corresponds to, e.g., an imaging unit in this embodiment and includes a column 15 and a sample chamber 22, an electron gun 16, a condenser lens 17, a deflector 18, an objective lens 21, and a detector 20 are provided in the column 15, and a stage 10 that supports a wafer 11 as a sample having an inspection pattern formed thereon and an actuator 23 are provided in the sample chamber 22.

The computer 13 is connected with the scan control circuit 19, the detector 20, and the actuator control circuit 24. The scan control circuit 19 is connected with the deflector 18 in the column, and the actuator control circuit 24 is connected with the actuator 23 in the sample chamber 22. The computer 13 is also connected with the monitor 14 and the memories MR2 and 4.

An electron beam 1 emitted from the electron gun 16 is condensed by the condenser lens 17, then subjected to focal position adjustment by the objective lens 21, and applied to the wafer 11. The scan control circuit 19 generates a control signal in accordance with an instruction from the computer 13, and the deflector 18 forms a deflection electric field or a deflection magnetic field based on the control signal supplied from the scan control circuit 19 to appropriately deflect the electron beam 1 in an X direction and a Y direction, thereby scanning a surface of the wafer 11. A secondary electron, a reflection electron, and a backscattered electron are generated from the surface of the wafer 11 based on application of the electron beam 1, these electrons are detected by the detector 20, and a detection signal is supplied to the computer 13. In this embodiment, each of the secondary electron, the reflection electron, and the backscattered electron corresponds to, e.g., a charged particle. The computer 13 processes the detection signal supplied from the detector 20 to form an image of a pattern on a sample surface (an SEM (Scanning Electron Microscope) image), and displays this image on the monitor 14. The stage 10 can move in the X direction and the Y direction, and the actuator 23 moves the stage 10 in accordance with a control signal generated by the actuator control circuit 24 in response to an instruction from the computer 13.

The memory MR2 stores CAD data of an inspection pattern. The memory MR4 stores a recipe file in which a later-explained procedure of a pattern inspection method is written, and the computer 13 reads this recipe file to execute pattern inspection. In this embodiment, the computer 13 corresponds, e.g., a matching unit, an arithmetic unit, a judgment unit, a correction unit, and an inspection unit.

An operation of the pattern inspection apparatus depicted in FIG. 1 will be explained as an embodiment of a pattern inspection method according to the present invention with reference to FIGS. 2 to 8.

(2) Pattern Inspection Method

Figure 2:
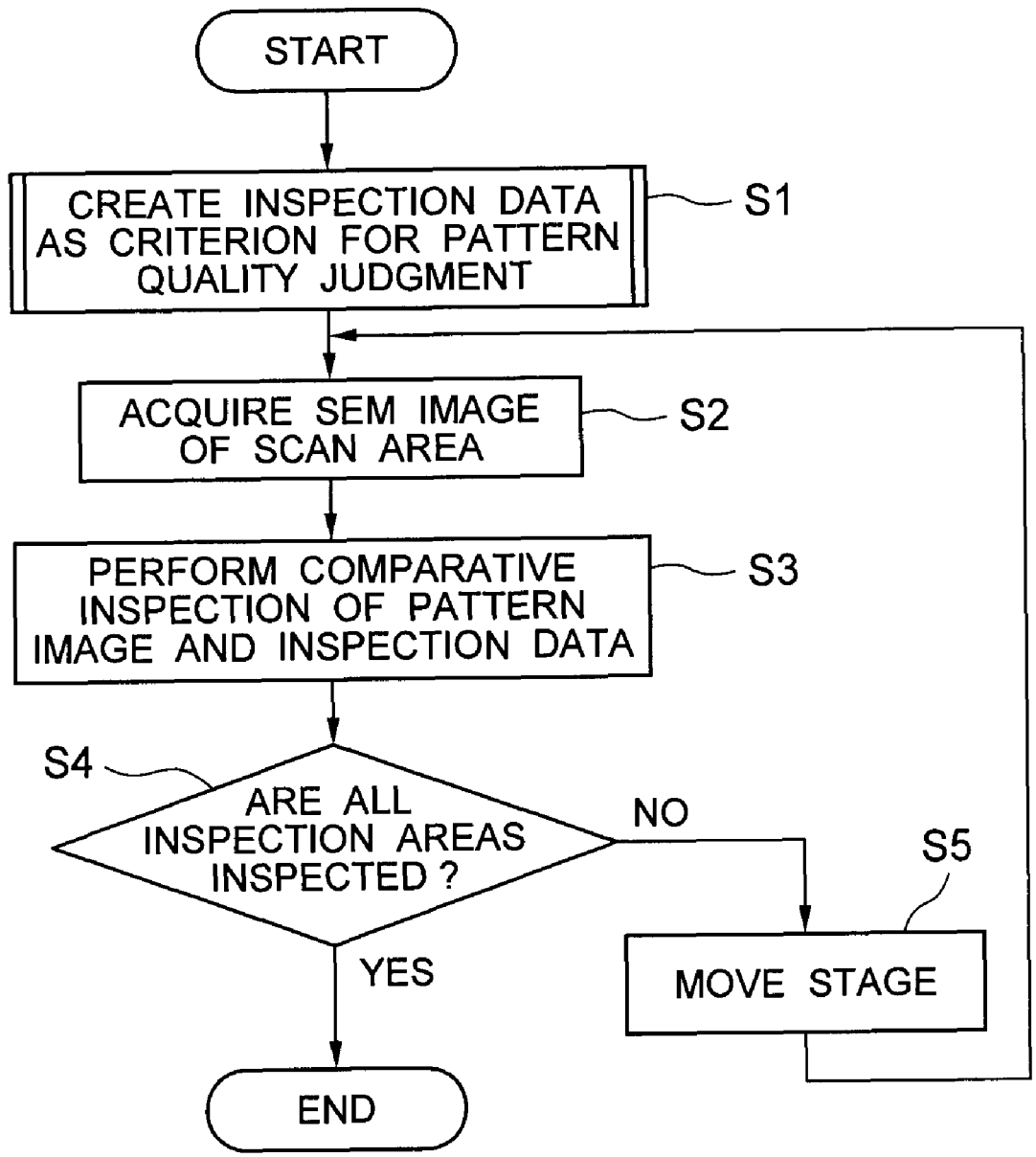
FIG. 2 is a flowchart showing an outline procedure of an embodiment of a pattern inspection method according to the present invention.

FIG. 2 is a flowchart showing an outline procedure of a pattern inspection method according to this embodiment.

First, prior to inspection, inspection data that is a criterion for a pattern quality judgment is created (a step S1). This inspection data is one of characteristic points in this embodiment, and it is created by extracting a first coordinate group from coordinates on a line segment connecting vertexes of a polygon figure included in CAD data, further extracting a second coordinate group corresponding to the first coordinate group from edge coordinates of a pattern in an SEM image, and correcting vertex positions of the polygon figure by using a correction table created from a difference between these coordinate groups. An example of a specific inspection data creation method will be explained data.

Then, the scanning electron microscope 12 scans an inspection region on a wafer surface by using an electron beam, and acquires an SEM image of each scan area obtained by dividing the inspection region (a step S2).

Figure 3:
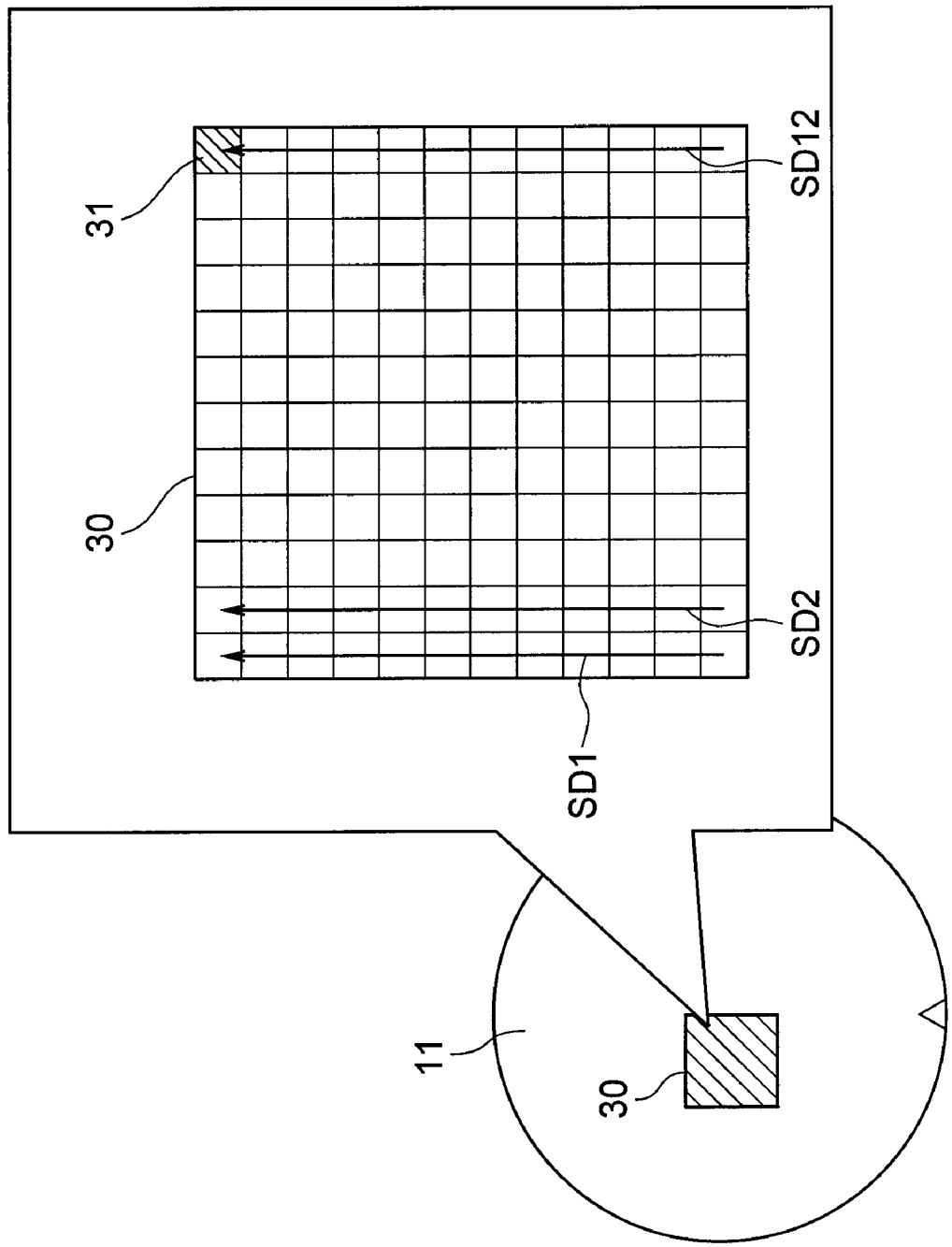
FIG. 3 is an explanatory view showing a relationship between an inspection area and a scan area.

FIG. 3 is an explanatory view showing a relationship between an inspection area and a scan area. In an example shown in this drawing, the scanning electron microscope 12 divides an inspection area 30 in the wafer 11 into scan areas 31 each having an image size that can be collectively acquired, and the computer 13 acquires an SEM image of each scan area 31.

The computer 13 further compares a pattern image in the SEM image with the inspection data to inspect a pattern (a step S3).

The computer 13 performs the above-explained SEM image acquisition and comparative inspection with respect to all the inspection regions while moving the stage 10 (steps S4 and S5). In this embodiment, the acquired SEM images and the inspection data are sequentially compared to inspect the pattern while sequentially repeating acquisition of an image in each scan area 31 and movement of the stage 10 from an arrow SD1 toward an arrow SD12 in FIG. 3.

A characteristic inspection data creation method in this embodiment will now be explained with reference to FIGS. 4 to 11.

Figure 4:
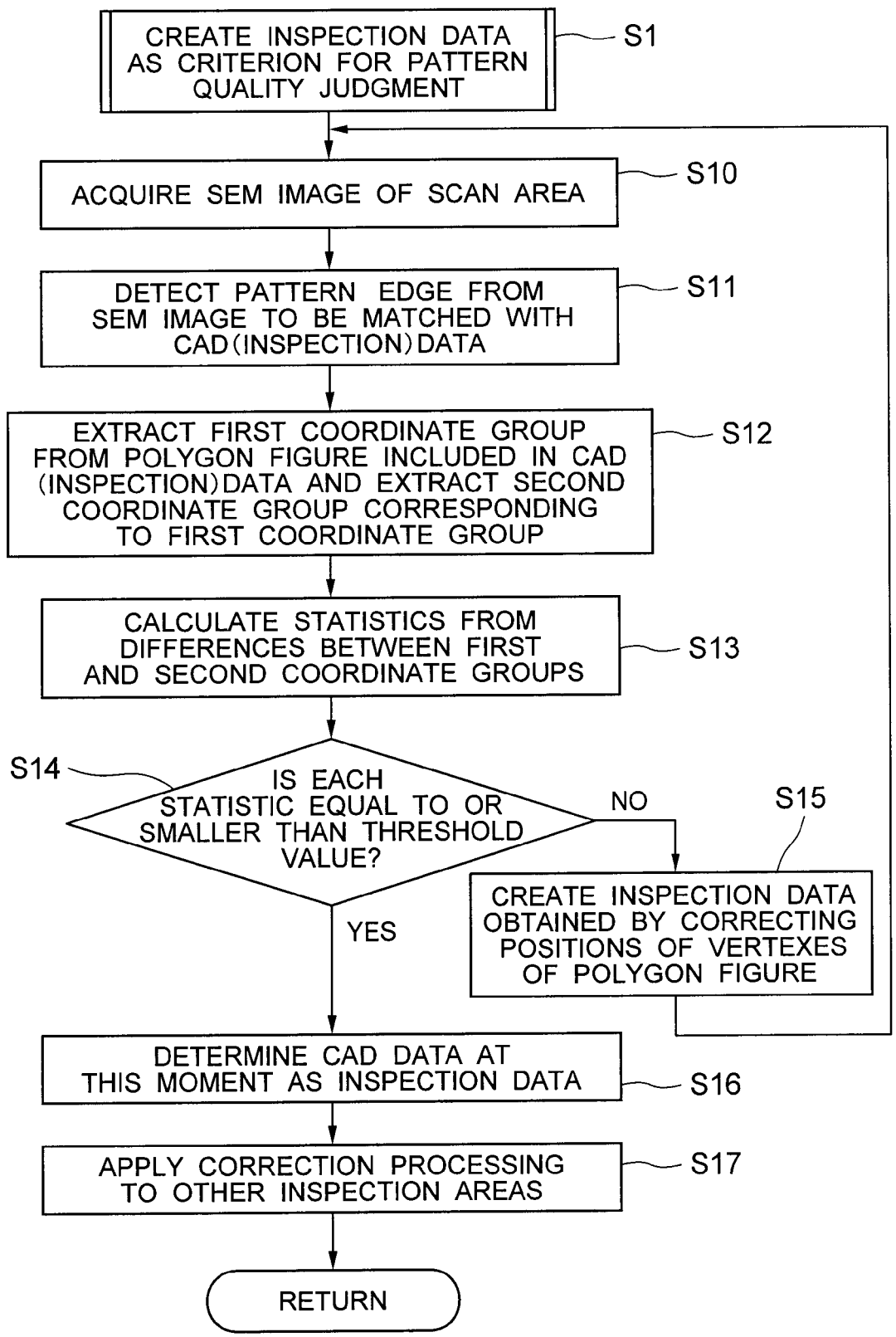
FIG. 4 is a flowchart showing an example of an inspection data creating procedure.

FIG. 4 is a flowchart showing an example of an inspection data creation procedure.

First, the computer 13 controls the scan control circuit 19 and the scanning electron microscope 12 to acquire an SEM image 4 of the scan area 31 with respect to an arbitrary region in the inspection area 30 (a step S10).

Figure 5:
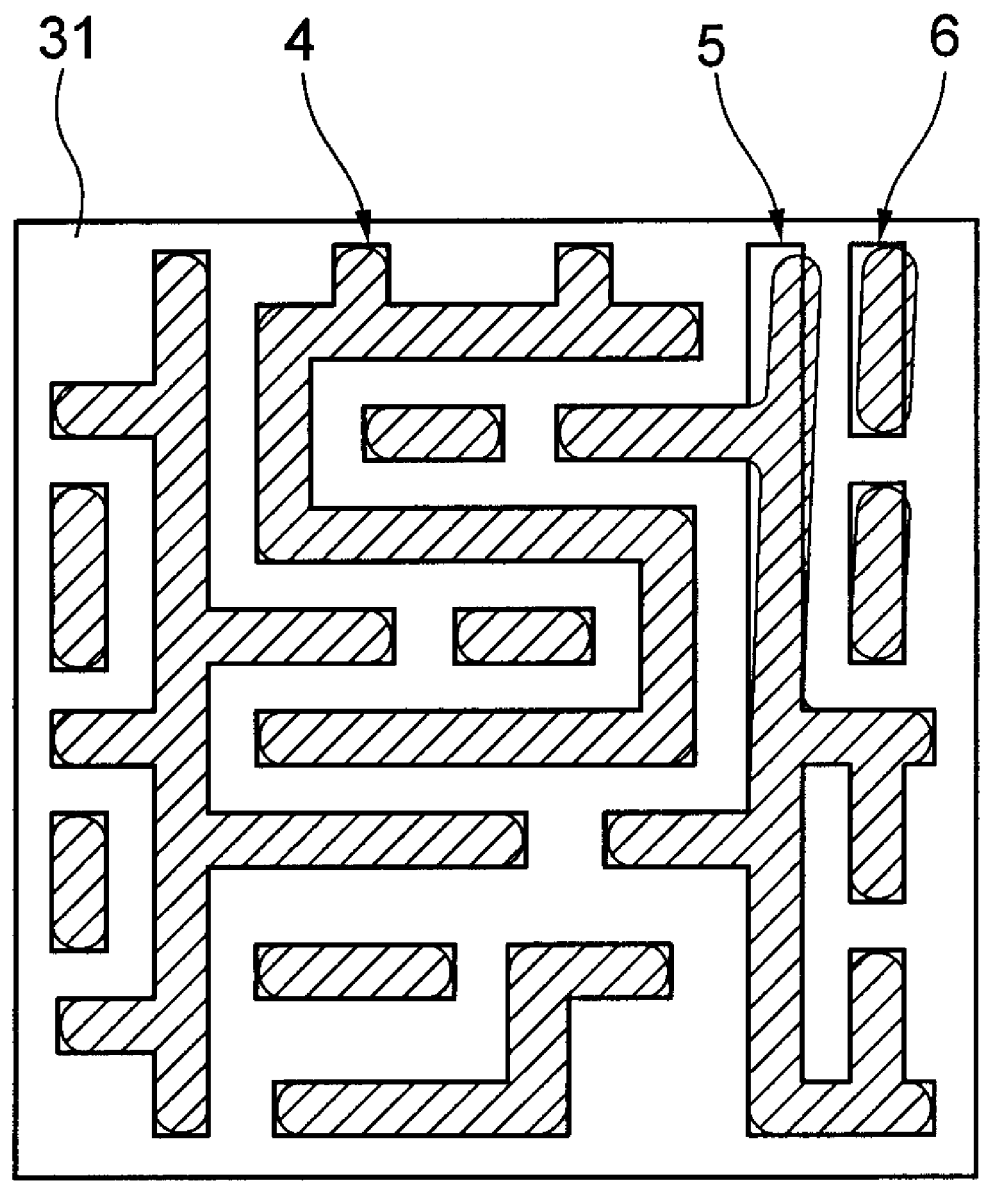
FIG. 5 is a view showing an example of a matching processing result of an SEM image of a scan area and CAD data associated therewith.

Then, the computer 13 detects an edge of a pattern from the SEM image 4, and matches the obtained pattern edge with CAD data corresponding thereto (a step S11). FIG. 5 shows an example of a matching result. A hatched portion in the drawing represents the SEM image of the inspection pattern.

Since the CAD data 5 is originally formed of information of vertexes 6, processing of coupling the vertexes 6 with each other through a line segment is performed in advance and a result is stored in the memory MR2 to facilitate matching with the SEM image of the inspection pattern. A figure obtained by visualizing the CAD data based on such processing is a polygon figure drawn near the edge of the SEM image 4 in FIG. 5.

Again referring to FIG. 4, the computer 13 extracts coordinates of a plurality of points to be defined as a first coordinate group from a line segment constituting the polygon figure included in the CAD data 5 in accordance with a predetermined rule, and further specifies coordinates of edge points corresponding to the points in the first coordinate group to be defined as a second coordinate group on the pattern edge of the SEM image (a step S12).

Subsequently, the computer 13 calculates differences between the first coordinate group and the second coordinate group, obtains predetermined statistics from the calculated differences (a step S13), and compares each obtained statistic with a preset threshold value to judge whether correction processing is required (a step S14).

When the statistic is equal to or smaller than the threshold value, the computer 13 directly uses the CAD data 5 as the inspection data. On the other hand, when the statistic exceeds the predetermined threshold value, positions of the vertexes of the polygon figure are corrected with respect to the CAD data 5, and the corrected CAD data 5 is temporarily defined as inspection data (a step S15).

Figure 9:
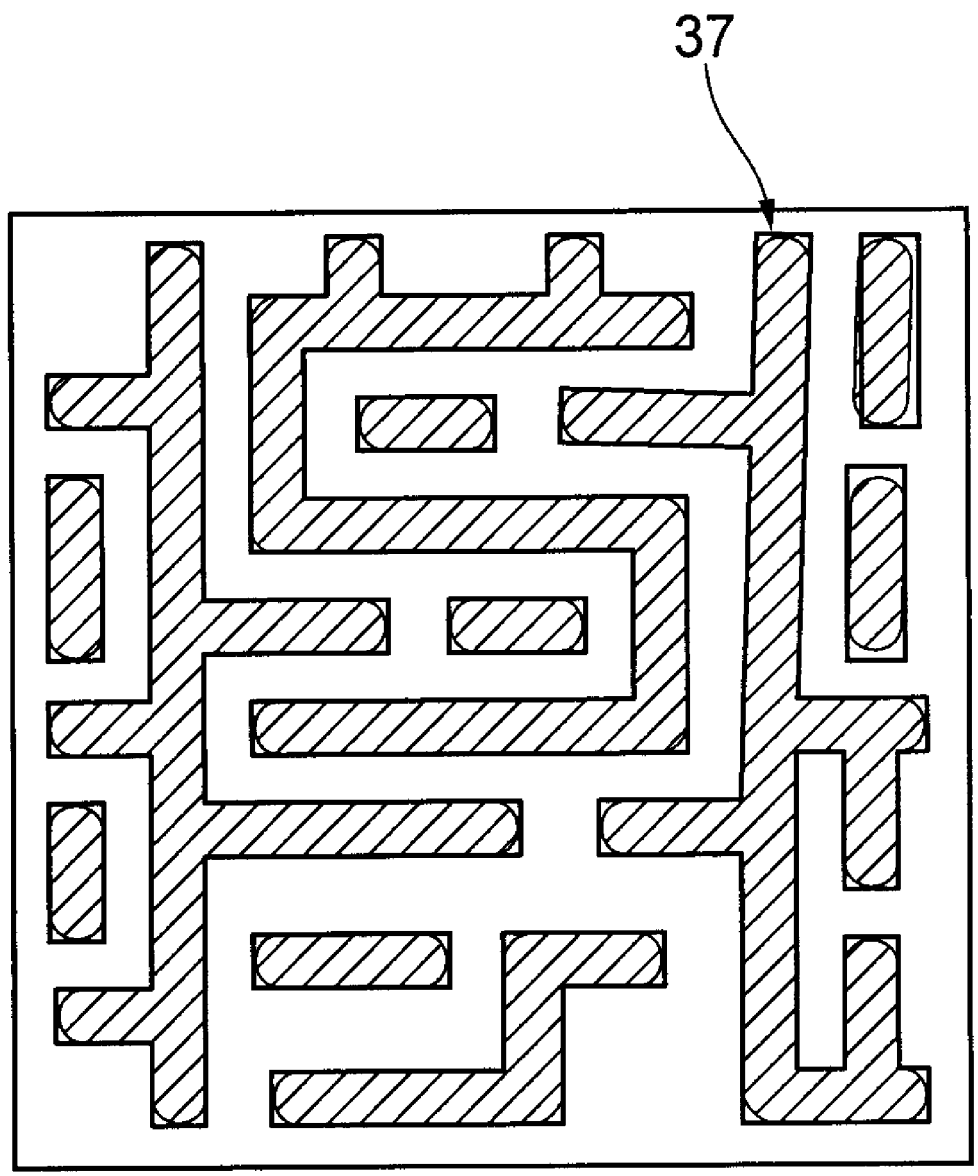
FIG. 9 is a view showing an example of inspection data obtained from the scan area subjected to matching processing depicted in FIG. 5.

The computer 13 repeats the above-explained procedure (the steps S10 to S15) until the statistic becomes equal to or smaller than the threshold value, and then acquires definite inspection data with respect to an arbitrary region (a step S16). FIG. 9 shows an example of inspection data obtained from a scan area subjected to the matching processing depicted in FIG. 5. It can be understood from comparison with FIG. 5 that vertex coordinates of the polygon figure are corrected in FIG. 9. In particular, it should be noted that corresponding vertex coordinates in the polygon figure are greatly corrected in an upper right portion so that the line segments in the portion which are originally vertical are tilted to the right, pursuant to the inclination of the inspection pattern of the SEM image 4 due to a large distortion.

At last, the computer 13 applies the correction processing executed until the inspection data becomes definite to all remaining parts of the inspection area (a step S17), thereby acquiring final inspection data with respect to the entire inspection area.

According to this embodiment, since only coordinate information of the minimum necessary vertexes 6 representing a pattern shape is utilized as the CAD data 5, the correction processing for the CAD data 5 can be executed at a high speed. Further, since positional information of the vertexes 6 is included in the CAD data 5 in advance, a data amount of the CAD data 5 is not increased during correction. As a result, handling of the CAD data 5 that is considered as the heaviest burden on die-to-database inspection and a burden of data processing on the computer 13 at the time of comparative inspection can be minimized, thereby enabling high-speed inspection.

Figure 6:
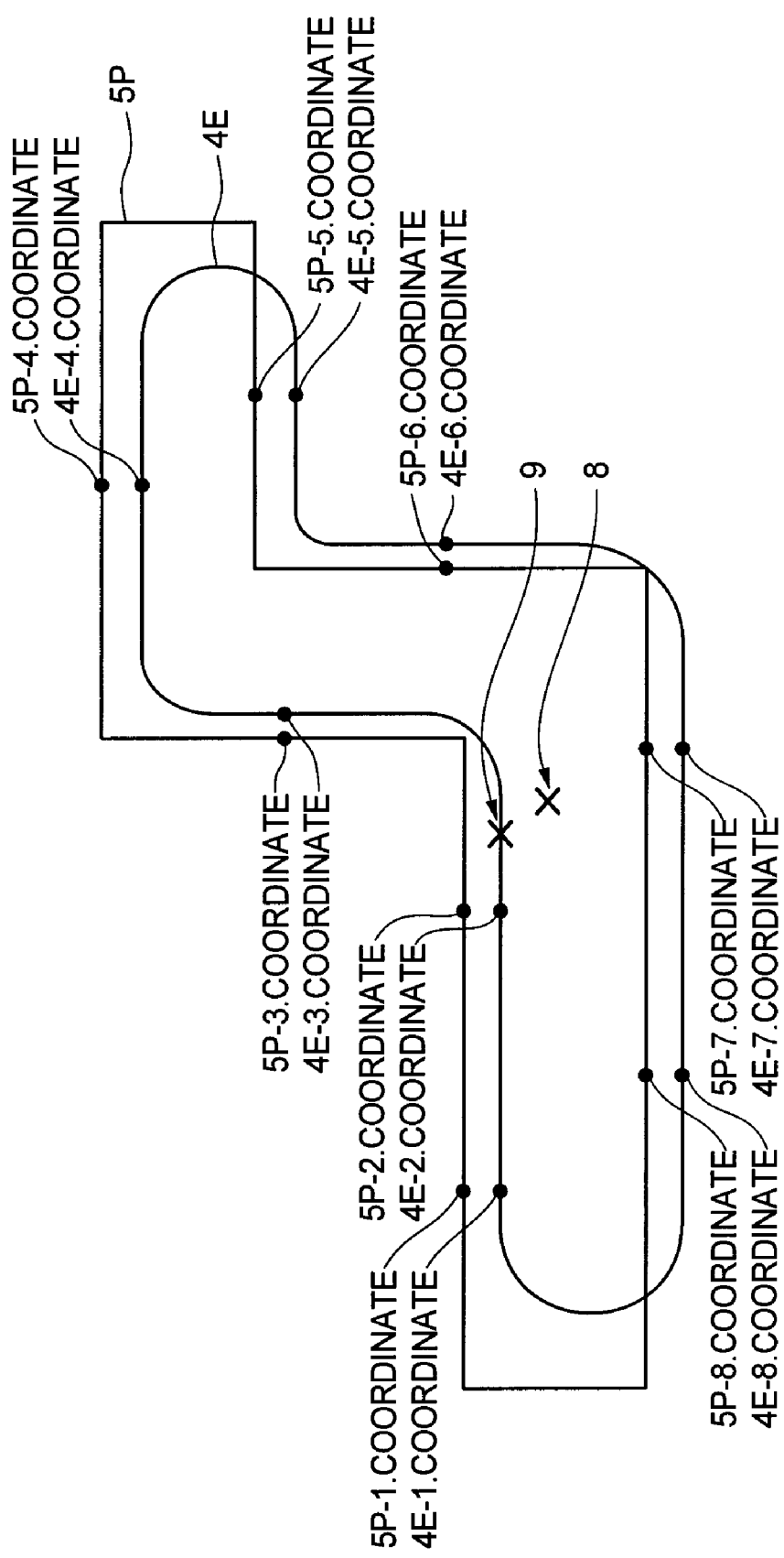
FIG. 6 is a view showing a matching result of a part of a pattern edge in an SEM image and a polygon figure associated therewith.
Figure 7:
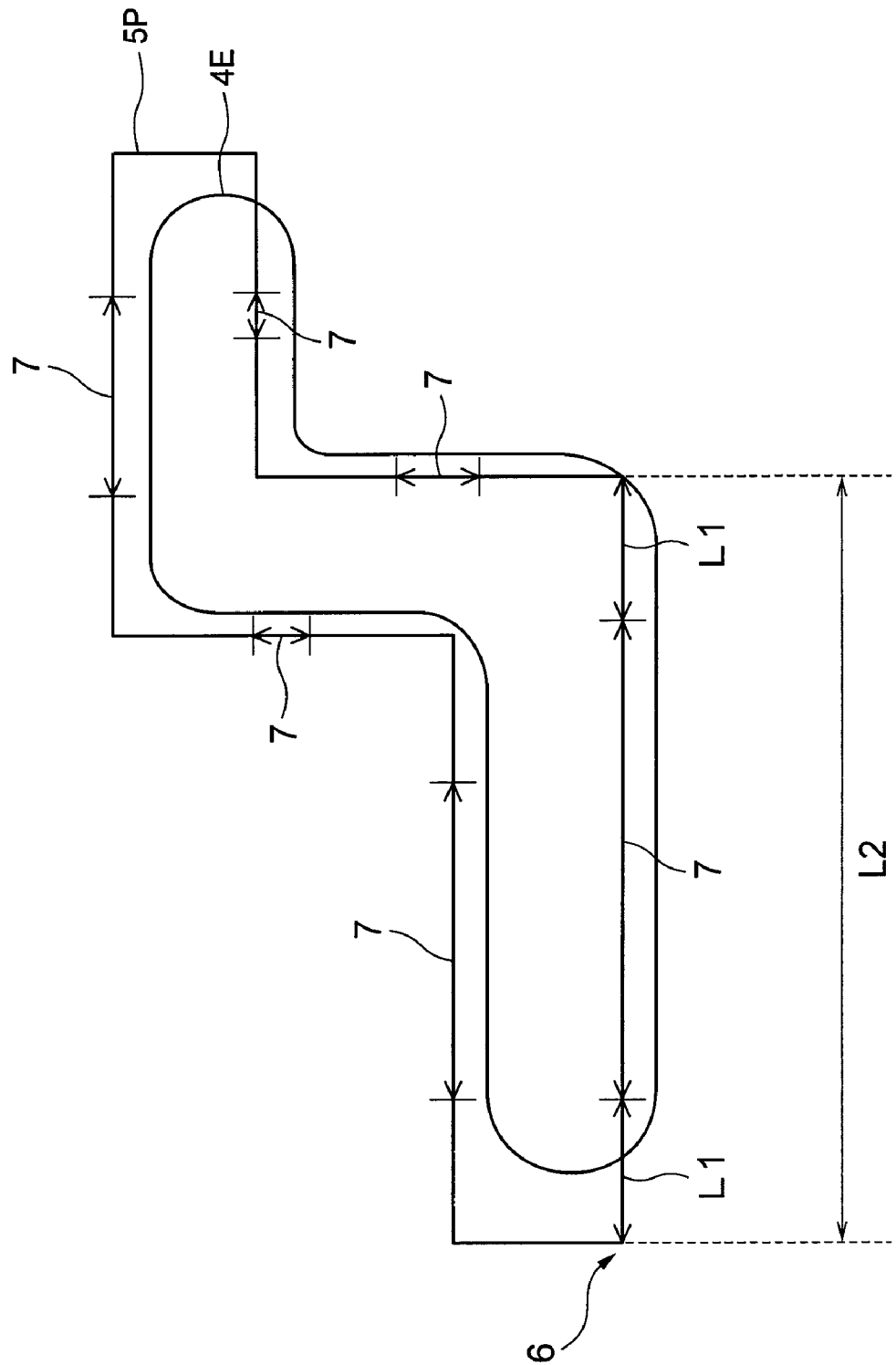
FIG. 7 is a view showing an example of a first coordinate group extraction method.

A specific example of a definition method for each coordinate group will now be explained with reference to FIGS. 6 to 8. FIG. 6 shows a matching result of an edge 4E as a part of a pattern edge in the SEM image 4 and a polygon FIG. 5P as a part corresponding to the edge 4 in the CAD data 5. In the example depicted in FIG. 6, the polygon FIG. 5P and the edge 4E deviate from each other due to occurrence of a distortion of the SEM image in an end portion of the scan area 31.

The first coordinate group is extracted from points on a line segment of the polygon FIG. 5P like coordinates 5P-1 to 5P-8 depicted in FIG. 6. As the second coordinate group, a group of coordinates on the edge of the SEM image placed at positions closest to the line segment of the polygon FIG. 5P in the vertical direction is extracted from the first coordinate group like coordinates 4E-1 to 4E-8 in FIG. 6. For example, in FIG. 6, an edge point of the SEM image corresponding to the coordinate 5P-1 on the polygon FIG. 5P is 4E-1.

In general, each corner portion of the pattern has a complicated shape, an edge detection accuracy in the SEM image is low. Further, in regard to a coordinate position accuracy on the edge of the SEM image corresponding to the first coordinate group on the line segment of the polygon FIG. 5P, each corner portion is inferior to any other portions. Thus, when the first coordinate group is extracted from vertexes of the CAD data and regions near the vertexes, i.e., a region excluding regions corresponding to the corner portions of the SEM image, a correction accuracy can be improved. For example, each point on the line segment in a region that is apart from a vertex by a distance L1 (which will be referred to as a "coordinate group extraction region" hereinafter) is extracted as the first coordinate group as shown in FIG. 7.

A minimum dimension of the pattern included in the CAD data 5 may be extracted, and a value of the distance L1 may be determined based on a value of this minimum dimension.

As the number of points on the line segment of the polygon FIG. 5P extracted from the coordinate group extraction region 7 to define the first coordinate group, a number that is in proportion to a length L2 between vertexes adjacent to each other may be used, for example. As a result, coordinates can be uniformly extracted from each line segment constituting each polygon FIG. 5P, and a difference between the pattern included in the CAD data 5 and the edge of the SEM image can be accurately calculated. Consequently, a difference from the edge of the SEM image can be accurately calculated even if the number of points in the first coordinate group is small, a processing time for calculation can be reduced, and a statistic calculation frequency can be increased.

When a plurality of points on the polygon FIG. 5P that define the first coordinate group are extracted in the range of the coordinate group extraction region 7, the most preferable conformation is that these points are extracted at equal intervals, but the points may be randomly extracted from the range of the coordinate group extraction region 7.

A statistic representing a degree of deviation in matching of the CAD data and the SEM image will now be more specifically explained.

Figure 8B:
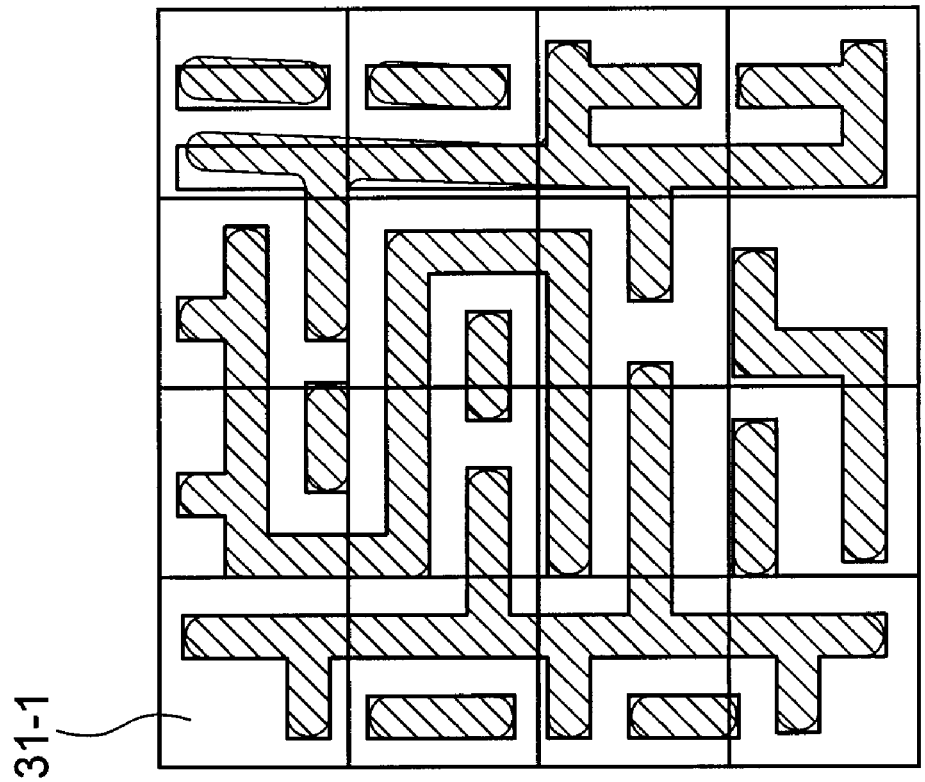
FIG. 8B is an explanatory view of divided scan areas.
Figure 8A:
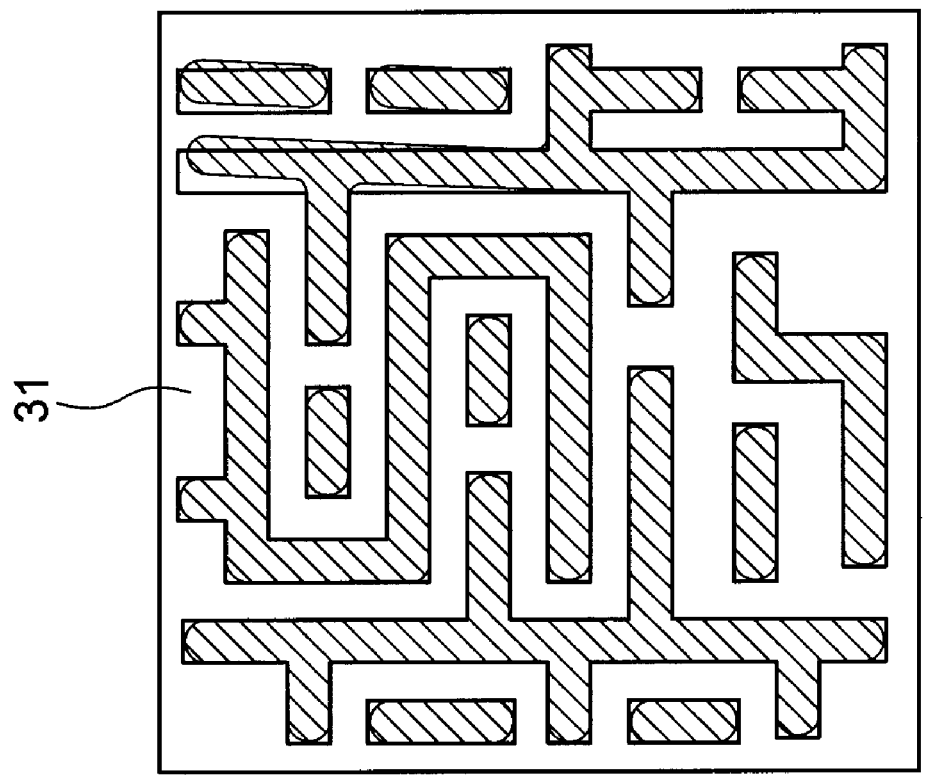
FIG. 8A is an explanatory view of a scan area.
Figure 10:
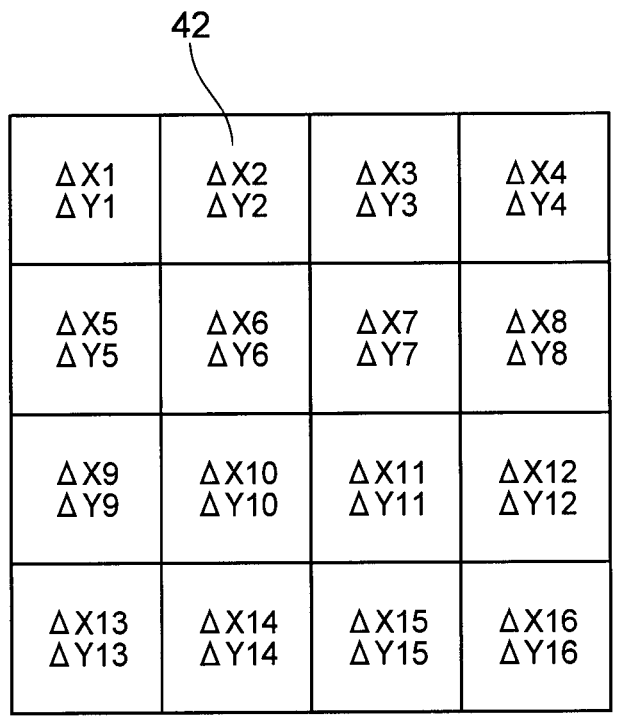
FIG. 10 is a table showing an example of statistics.

In this embodiment, for example, the computer 13 further divides the scan area 31 shown in FIG. 8A into pieces to create divided scan areas 31-1 depicted in FIG. 8B, calculates a statistic with respect to each of these divided scan areas 31-1, and calculates each difference obtained from the first coordinate group and the second coordinate group as an average value in each of the X direction and the Y direction. FIG. 10 shows a calculation example of the thus obtained statistics (reference numeral 42 in FIG. 10).

Figure 11:
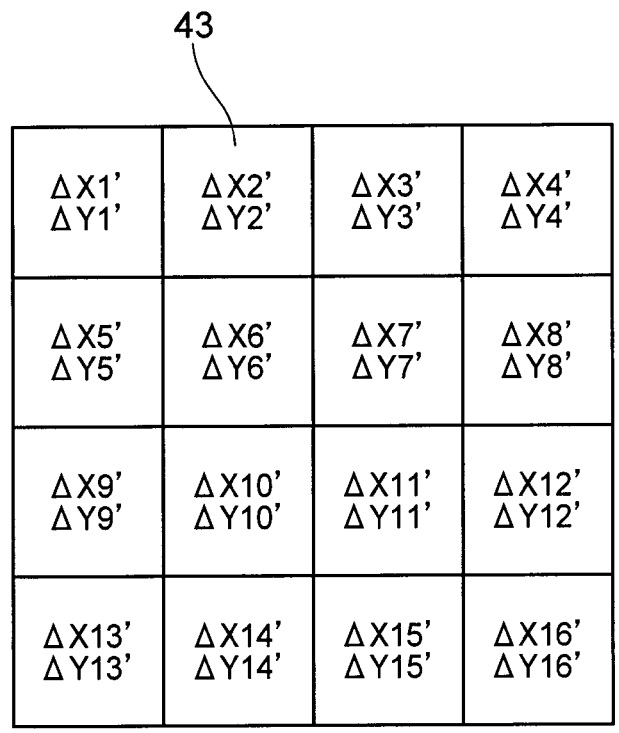
FIG. 11 is a correction table showing an example of correction amounts of positions of polygon figure vertexes.

For example, as shown in FIG. 11, a correction amount for the positions of the vertexes 6 of the polygon FIG. 5P is obtained by, e.g., reversing a sign of an average value of differences obtained from the first coordinate group and the second coordinate group with respect to each of the divided scan areas 31-1 (reference numeral 43 in FIG. 11).

The computer 13 uses a correction amount 43 calculated from each of the divided scan areas 31-1 to correct each vertex coordinate of the polygon FIG. 5P for each divided scan area 31-1 to create inspection data.

According to this embodiment, the calculation of each statistic 42, the judgment on correction, and the calculation of each correction amount 43 are carried out in an arbitrary region before inspection is effected, and inspection data obtained by correcting coordinates of the vertexes 6 of the CAD data 5 with respect to all the scan areas 31 in the inspection area 30 with the correction amount 43 is used, a time is not wasted during inspection, and high-speed inspection is enabled.

(3) Manufacturing Method of Semiconductor Device

When the pattern inspection method is used in a manufacturing process of a semiconductor device, a pattern can be highly accurately inspected in a short time, the semiconductor device can be manufactured with a higher yield ratio and a higher throughput.

More specifically, a substrate is sampled in units of production lot, and a pattern formed on the sampled substrate is inspected based on the above-explained pattern inspection method. When the pattern is determined as a non-defective pattern beyond a threshold value set in accordance with product specifications as a result of the inspection, the remaining manufacturing process is continuously performed with respect to the entire production lot to which the sampled substrate belongs to. On the other hand, when the pattern is determined as a defective pattern as a result of the inspection and rework processing is possible, the rework processing is performed with respect to the production lot to which the substrate having the pattern determined as a defective pattern formed thereon belongs to. Upon completion of the rework processing, a substrate is again sampled from the production lot to again inspect a pattern. When the sampled substrate is determined as a non-defective unit in the re-inspection of the pattern, the remaining manufacturing process is implemented with respect to the production lot on which the rework processing is finished. Further, when the rework processing is impossible, the production lot to which the substrate having the pattern determined as a defective pattern belongs to is discarded. When a defect occurrence factor can be analyzed, an analysis result is fed back to, e.g., a person in charge of design or a person in charge of upstream processes.

Although the embodiment according to the present invention has been explained above, the present invention is not restricted thereto, and it can be of course modified and applied in many ways within the scope thereof.

For example, although the inspection data is created by applying a correction amount when a statistic in an arbitrary region in the inspection area becomes equal to or below a threshold value to any other region in the foregoing embodiment, the inspection data may be created by, e.g., performing correction in such a manner a statistic becomes equal to or below the threshold value in all scan areas in accordance with a required inspection accuracy.

Furthermore, although an average value is used as the statistic, the present invention is not restricted thereto, and a dispersion value or a range between a maximum value and a minimum value may be used, for example. Moreover, when center-of-gravity coordinates are respectively calculated from the first coordinate group and the second coordinate group in units of each polygon figure and a statistic calculated from a difference between the calculated center-of-gravity coordinates is used, a correction accuracy can be further increased.

Additionally, when the statistic 42 is automatically calculated from an inspection pattern and a position of each vertex 6 of the polygon figure is automatically corrected if the statistic 42 exceeds a specified value during inspection, a change in distortion during inspection due to a fluctuation of the apparatus during inspection or electrification on the wafer can be also corrected, the inspection with a higher accuracy can be carried out.

Although the example where the SEM image 4 is acquired in the inspection area 30 to calculate each statistic 42 has been explained in the foregoing embodiment, the present invention is not restricted to the inspection area 30, and the SEM image 4 may be acquired in, e.g., an arbitrary area specified on the wafer or from a calibration substrate arranged at an end portion of the stage 10 to calculate the statistic 42.

Further, although the CAD data 5 is previously subjected to the processing of coupling the vertexes 6 with the line segment and stored in the memory MR2 in the foregoing embodiment, the present invention is not restricted thereto, and the computer 13 may execute processing of, e.g., fetching GDSII data alone and coupling the vertexes 6 with each other with the line segment.

Furthermore, although the die-to-database inspection has been explained in the foregoing embodiment, the present invention is not restricted thereto, and it may be applied to a measuring apparatus using CAD data (e.g., a CDSEM or a DR (Defect Review) SEM). In particular, when the size of the scan area 31 is increased, a deviation amount may be increased between the polygon figure and the SEM image due to a distortion of the SEM image, and an error may occur in an edge detection process to disable measurement. When the present invention is applied in such a case, since a matching performance of the polygon figure and a pattern is improved, a pattern edge detection performance can be enhanced to avoid an error in edge detection, thereby increasing a pattern measurement accuracy. Specifically, in the pattern inspection apparatus depicted in FIG. 1, it can be achieved by providing the computer 13 with a function of specifying a measurement target position in a pattern based on a corrected polygon figure and of measuring various dimensions of the pattern by using detected pattern edge information.

What is claimed is:

1. A pattern inspection apparatus comprising:
an imaging unit which scans a substrate having a pattern formed thereon with a charged particle beam and detects charged particles generated from the substrate to acquire an image of the pattern;
a matching unit which performs matching of CAD data for the pattern and the image;
an arithmetic unit which extracts coordinates of a plurality of points on a line segment which is drawn by use of the CAD data and constitutes an arbitrary polygon figure, defines the extracted coordinates as a first coordinate group, specifies coordinates of edge points in the image that correspond to the plurality of points, defines the specified coordinates as a second coordinate group, calculates differences between the coordinates corresponding to each other from the first and second coordinate group, and calculates statistics each representing a degree of deviation in the matching based on the differences;
a judgment unit which judges whether correction processing is required based on the statistics;
a correction unit which performs the correction processing to correct the polygon figure when the judgment unit determines that the correction processing is required; and
an inspection unit which inspects the pattern by comparing the corrected polygon figure with the image.

2. The pattern inspection apparatus according to claim 1, wherein the arithmetic unit extracts the first coordinate group from each region that is apart from vertexes adjacent to each other in the arbitrary polygon figure by a predetermined distance in the arbitrary polygon figure.

3. The pattern inspection apparatus according to claim 1, wherein the arithmetic unit determines the number of the plurality of points in accordance with a distance between vertexes adjacent to each other in each polygon figure.

4. The pattern inspection apparatus according to claim 1, wherein the arithmetic unit uses any one of an average value of the difference, a dispersion value of the difference, and a value in a range of a maximum value and a minimum value of the difference as the statistic.

5. The pattern inspection apparatus according to claim 1, wherein the arithmetic unit calculates a difference between center-of-gravity coordinates from the first and second coordinate groups as the difference by each polygon figure.

6. The pattern inspection apparatus according to claim 1, wherein the correction unit creates a correction table in an arbitrary region by using the statistics, and corrects vertex coordinates of the polygon figure by referring to the correction table.

7. The pattern inspection apparatus according to claim 1, wherein the substrate having the pattern formed thereon includes a first substrate having a first pattern as an inspection target formed thereon and a second substrate having a second pattern for calibration formed thereon,
the matching unit performs matching between the CAD data and an image of the second pattern, and
the inspection unit compares the corrected polygon figure with an image of the first pattern.

8. A pattern inspection method comprising:
scanning a substrate having a pattern formed thereon with a charged particle beam and detecting charged particles generated from the substrate to acquire an image of the pattern;
performing matching of CAD data for the pattern and the image;
extracting coordinates of a plurality of points on a line segment which is drawn by use of the CAD data and constitutes an arbitrary polygon figure, and defining the extracted coordinates as a first coordinate group;
specifying coordinates of edge points in the image that correspond to the plurality of points, and defining the specified coordinates as a second coordinate group;
calculating differences between the coordinates corresponding to each other from the first and second coordinate group, and calculating statistics each representing a degree of deviation in the matching based on the differences;
judging whether correction processing is required based on the statistics;

performing the correction processing to correct the polygon figure when it is determined that the correction processing is required; and inspecting the pattern by comparing the corrected polygon figure with the image.

9. The pattern inspection method according to claim 8, wherein the CAD data is constituted of data of vertex coordinates of the polygon figure alone, and the pattern inspection method further comprises coupling the vertexes with each other through a line segment.

10. The pattern inspection method according to claim 8, wherein the first coordinate group is extracted from a region in the line segment that is apart from vertexes of the line segment adjacent to each other by a predetermined distance, respectively.

11. The pattern inspection method according to claim 10, wherein the predetermined distance is determined based on a minimum dimension value of the arbitrary polygon figure.

12. The pattern inspection method according to claim 8, wherein the coordinates of the plurality of points are extracted at equal intervals in the line segment.

13. The pattern inspection method according to claim 8, wherein the coordinates of the plurality of points are randomly extracted in the line segment.

14. The pattern inspection method according to claim 8, wherein the number of the plurality of points is determined in accordance with a distance between vertexes adjacent to each other in each polygon figure.

15. The pattern inspection method according to claim 8, wherein any one of an average value of the difference, a dispersion value of the difference, and a value in a range between a maximum value and a minimum value of the difference is used as the statistic.

16. The pattern inspection method according to claim 8, wherein calculating the statistic includes calculating a difference between center-of-gravity coordinates from the first and second coordinate groups for each polygon figure.

17. The pattern inspection method according to claim 8, wherein performing the correction processing includes creating a correction table in an arbitrary region by using the statistics and correcting vertex coordinates of the polygon figure by referring to the correction table.

18. The pattern inspection method according to claim 8, wherein whether the correction processing is required is judged by comparing each of the statistics with a predetermined threshold value.

19. The pattern inspection method according to claim 8, wherein the substrate having the pattern formed thereon includes a first substrate having a first pattern as an inspection target formed thereon and a second substrate having a second pattern for calibration formed thereon, the matching is performed between the CAD data and an image of the second pattern, and the inspection is carried out by comparing a corrected polygon figure with an image of the first pattern.

20. A manufacturing method of a semiconductor device comprising:

executing a manufacturing process of a semiconductor device with respect to a substrate when requested specifications are satisfied as a result of inspecting a pattern formed on the substrate based on a pattern inspection method, the pattern inspection method including:

scanning a substrate having a pattern formed thereon with a charged particle beam and detecting charged particles generated from the substrate to acquire an image of the pattern;

performing matching of CAD data for the pattern and the image;

extracting coordinates of a plurality of points on a line segment which is drawn by use of the CAD data and constitutes an arbitrary polygon figure, and defining the extracted coordinates as a first coordinate group;

specifying coordinates of edge points in the image that correspond to the plurality of points, and defining the specified coordinates as a second coordinate group;

calculating differences between the coordinates corresponding to each other from the first and second coordinate group, and calculating statistics each representing a degree of deviation in the matching based on the differences;

judging whether correction processing is required based on the statistics;

performing the correction processing to correct the polygon figure when the judgment unit determines that the correction processing is required; and inspecting the pattern by comparing the corrected polygon figure with the image.

* * * * *